US009128727B2

(12) United States Patent
Java et al.

(10) Patent No.: US 9,128,727 B2
(45) Date of Patent: Sep. 8, 2015

(54) GENERATION OF MANAGED ASSEMBLIES FOR NETWORKS

(75) Inventors: Punit Java, Redmond, WA (US); Stephan Schueerholz, Monroe, WA (US); Pranish Kumar, Kirkland, WA (US); Jered D. Aasheim, Bellevue, WA (US); Jason Whitehorn, Sammamish, WA (US); Cory Hendrixson, Bellevue, WA (US); Robert Houser, Snoqualmie, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 2095 days.

(21) Appl. No.: 11/502,145

(22) Filed: Aug. 9, 2006

(65) Prior Publication Data

US 2008/0127056 A1    May 29, 2008

(51) Int. Cl.
*G06F 9/44* (2006.01)
*G06F 9/45* (2006.01)
*H04L 29/06* (2006.01)

(52) U.S. Cl.
CPC *G06F 8/427* (2013.01); *G06F 8/30* (2013.01); *H04L 29/06* (2013.01)

(58) Field of Classification Search
CPC ............... G06F 8/72; G06F 8/76; G06F 8/52; G06F 8/63; G06F 8/64
See application file for complete search history.

(56) References Cited

U.S. PATENT DOCUMENTS

| 5,732,074 | A | | 3/1998 | Spaur et al. | 370/313 |
|---|---|---|---|---|---|
| 5,926,637 | A | * | 7/1999 | Cline et al. | 717/103 |
| 6,389,481 | B1 | * | 5/2002 | Malcolm | 719/310 |
| 6,405,364 | B1 | * | 6/2002 | Bowman-Amuah | 717/101 |
| 6,430,164 | B1 | | 8/2002 | Jones et al. | 370/313 |
| 6,536,037 | B1 | * | 3/2003 | Guheen et al. | 717/151 |
| 6,631,519 | B1 | * | 10/2003 | Nicholson et al. | 717/169 |
| 6,769,095 | B1 | * | 7/2004 | Brassard et al. | 715/234 |
| 6,847,872 | B2 | | 1/2005 | Bodin et al. | 701/33 |
| 6,904,348 | B2 | | 6/2005 | Drummond et al. | 701/49 |
| 6,978,198 | B2 | | 12/2005 | Shi | 701/33 |
| 6,996,801 | B2 | * | 2/2006 | Yoneyama | 717/107 |
| 7,152,229 | B2 | * | 12/2006 | Chong et al. | 717/146 |
| 7,167,874 | B2 | * | 1/2007 | Shalabi et al. | 1/1 |
| 7,234,138 | B2 | * | 6/2007 | Crevatin | 717/168 |
| 7,305,671 | B2 | * | 12/2007 | Davidov et al. | 717/172 |
| 7,346,889 | B1 | * | 3/2008 | Semenov et al. | 717/106 |

(Continued)

OTHER PUBLICATIONS

Frederiksson, Lars-Berno; "*CAN for Critical Embedded Automotive Networks*"; Kvaser AB, IEEE Jul.-Aug. 2002; 8 pgs.

(Continued)

*Primary Examiner* — Tuan Q. Dam
*Assistant Examiner* — Zheng Wei
(74) *Attorney, Agent, or Firm* — John Jardine; Kate Drakos; Micky Minhas

(57) ABSTRACT

A network toolset enables developers to automatically generate a C header file and underlying signal software, as well as automatically generate a managed code assembly from a network description. The managed code assembly can be generated in a binary format and may include sufficient metadata to support extended functionalities for a network. The managed code assembly can be relatively easily integrated with an existing image (e.g., machine code for a network device) without any compilation required. A software development kit can also be generated to help programmers manage the generated assemblies.

20 Claims, 3 Drawing Sheets

(56) References Cited

U.S. PATENT DOCUMENTS

| | | | |
|---|---|---|---|
| 7,376,932 B2* | 5/2008 | Chen et al. | 717/106 |
| 7,409,673 B2* | 8/2008 | Kuo et al. | 717/112 |
| 7,454,743 B2* | 11/2008 | Fuchs | 717/108 |
| 7,500,224 B2* | 3/2009 | Hejlsberg et al. | 717/122 |
| 7,512,932 B2* | 3/2009 | Davidov et al. | 717/106 |
| 7,516,447 B2* | 4/2009 | Marvin et al. | 717/140 |
| 7,562,307 B2* | 7/2009 | Betts et al. | 715/762 |
| 7,565,647 B2* | 7/2009 | Davidov et al. | 717/140 |
| 7,594,225 B2* | 9/2009 | Barr et al. | 717/174 |
| 7,627,851 B2* | 12/2009 | Lotter | 717/106 |
| 7,634,722 B2* | 12/2009 | Barnett | 715/239 |
| 7,665,061 B2* | 2/2010 | Kothari et al. | 717/106 |
| 7,707,547 B2* | 4/2010 | Colton et al. | 717/118 |
| 7,707,549 B2* | 4/2010 | Chudukatil et al. | 717/120 |
| 7,739,696 B2* | 6/2010 | Wolfe et al. | 719/328 |
| 7,774,746 B2* | 8/2010 | Mansfield et al. | 717/106 |
| 7,779,385 B2* | 8/2010 | Hegde et al. | 717/107 |
| 7,840,937 B1* | 11/2010 | Chiluvuri | 717/106 |
| 8,051,408 B1* | 11/2011 | Johnson | 717/125 |
| 8,255,871 B1* | 8/2012 | Kompella et al. | 717/108 |
| 8,423,954 B2* | 4/2013 | Ronen et al. | 717/107 |
| 2001/0044811 A1* | 11/2001 | Ballantyne et al. | 707/513 |
| 2002/0040469 A1* | 4/2002 | Pramberger | 717/121 |
| 2002/0092004 A1* | 7/2002 | Lee et al. | 717/140 |
| 2002/0138824 A1* | 9/2002 | Shann | 717/140 |
| 2003/0135842 A1* | 7/2003 | Frey et al. | 717/121 |
| 2003/0146828 A1 | 8/2003 | Su et al. | 340/438 |
| 2003/0163587 A1 | 8/2003 | Knight et al. | 709/249 |
| 2003/0167456 A1* | 9/2003 | Sabharwal | 717/108 |
| 2003/0172370 A1* | 9/2003 | Satuloori et al. | 717/120 |
| 2003/0184552 A1* | 10/2003 | Chadha | 345/581 |
| 2003/0212956 A1* | 11/2003 | Uehara et al. | 715/513 |
| 2004/0010349 A1 | 1/2004 | Perez et al. | 700/287 |
| 2004/0015827 A1* | 1/2004 | Nicolle et al. | 717/104 |
| 2004/0015832 A1* | 1/2004 | Stapp et al. | 717/106 |
| 2004/0015834 A1* | 1/2004 | Mestre et al. | 717/106 |
| 2004/0073330 A1 | 4/2004 | Bader et al. | 700/220 |
| 2004/0088688 A1* | 5/2004 | Hejlsberg et al. | 717/143 |
| 2004/0153992 A1* | 8/2004 | Molina-Moreno et al. | 717/105 |
| 2004/0172617 A1* | 9/2004 | Ramani et al. | 717/114 |
| 2004/0261059 A1* | 12/2004 | Spencer et al. | 717/120 |
| 2004/0268304 A1* | 12/2004 | Kuo et al. | 717/109 |
| 2005/0060693 A1* | 3/2005 | Robison et al. | 717/143 |
| 2005/0097504 A1* | 5/2005 | Ballinger et al. | 717/100 |
| 2005/0120340 A1* | 6/2005 | Skazinski et al. | 717/140 |
| 2005/0132339 A1* | 6/2005 | Maron | 717/136 |
| 2005/0262476 A1* | 11/2005 | Felts | 717/115 |
| 2006/0005175 A1* | 1/2006 | Ringseth et al. | 717/143 |
| 2006/0010844 A1 | 1/2006 | Angott | 56/7 |
| 2006/0048112 A1* | 3/2006 | Thiagarajan et al. | 717/144 |
| 2006/0067341 A1* | 3/2006 | Barber et al. | 370/401 |
| 2006/0117307 A1* | 6/2006 | Averbuch et al. | 717/143 |
| 2006/0236307 A1* | 10/2006 | Debruin et al. | 717/117 |
| 2007/0006188 A1* | 1/2007 | Schroth et al. | 717/140 |
| 2007/0028221 A1* | 2/2007 | Ukelson et al. | 717/136 |
| 2007/0028223 A1* | 2/2007 | Meijer et al. | 717/140 |
| 2007/0079282 A1* | 4/2007 | Nachnani et al. | 717/106 |
| 2007/0113221 A1* | 5/2007 | Liu et al. | 717/143 |
| 2007/0198968 A1* | 8/2007 | Shenfield et al. | 717/104 |
| 2007/0234308 A1* | 10/2007 | Feigenbaum et al. | 717/130 |
| 2007/0245294 A1* | 10/2007 | Saito et al. | 717/100 |
| 2007/0271551 A1* | 11/2007 | Zurawka et al. | 717/120 |
| 2008/0059950 A1* | 3/2008 | Seitz et al. | 717/108 |
| 2008/0320508 A1* | 12/2008 | Ramaswamy et al. | 725/9 |
| 2011/0252402 A1* | 10/2011 | Sanoy | 717/120 |
| 2012/0005654 A1* | 1/2012 | Graham | 717/120 |

OTHER PUBLICATIONS

Lee, et al.; "*Network-based Fire-Detection System via Controller Area Network for Smart Home Automation*"; Korea Science and Engineering Foundation; IEEE Jul. 2004; 8 pgs.

Navet, Nicolas; "*Controller area network*"; IEEE Oct.-Nov. 1998; 3 pgs.

Papadoglou, et al.; "*Short message service link for automatic vehicle location*"; IEEExplore Release 2.1; May 27, 1999; 1 pg.

* cited by examiner

GENERATION OF MANAGED ASSEMBLIES FOR NETWORKS

BACKGROUND

Control area networks (CANs) are peer-to-peer networks that are typically used in vehicles. The CANs allow communication between electronic control units (ECUs) that are distributed across the network. The majority of automotive CAN networks are designed using tools that generate a set of data files that describe the interaction on this network. The most common format for this data is a ".dbc" file. While tools exist today that will generate C code for application developers and the underlying signal software that access this network, they lack some core functionality.

For example, the types of signals and protocols used by CANs are predefined by C language header files. The C language header files can usually only be accessed by software developers having access to proprietary formats and require a programmer's input to manage and expose. Additionally, the .dbc file is a proprietary data format file that only a relatively small number of toolsets support. Existing systems typically generate information from the .dbc which is statically compiled into system components. Existing systems also have little or no ability to support additional metadata for the information contained within the .dbc file.

SUMMARY

This summary is provided to introduce a selection of concepts in a simplified form that are further described below in the detailed description. This summary is not intended to identify key features or essential features of the claimed subject matter, nor is it intended as an aid in determining the scope of the claimed subject matter.

The present disclosure is directed to architecture for a toolset that enables developers to automatically generate not only a C header file and underlying signal software, but that also automatically generates a managed code assembly. The managed code assembly is generated in a binary format and includes sufficient metadata to support extended functionalities. The managed code assembly can be easily modified and/or the CAN database changed without the need for recompilation of modules that depend on this assembly. This support enables developers new to CAN to relatively easily develop software to operate on the CAN vehicle network with the confidence that future changes to this module will not "break" their code.

In addition to generation of a managed code assembly, the developer also has the option of creating an additional metadata file (e.g., in XML) that provides additional enhancements to all the software generated managed code assembly. These enhancements provided by meta-data can include security permissions for specific APIs (application programming interfaces) in the generated assembly and usage hints that allow optimization of system performance and network bandwidth based on this usage. Metadata can further support network filtering information that is used to generate low-level filter software that prevents applications that do not have unfettered systems access from accessing this data. Moreover, metadata can allow improved friendly naming for code generation to better support software developers.

With this toolset architecture developers can quickly generate a fully operational managed signal API software stack from their .dbc file. The developers can also use the toolset solution to make changes to the generated code assembly such that they can relatively easily create what they desire for their final shipping image.

These and other features and advantages will be apparent from a reading of the following detailed description and a review of the associated drawings. It is to be understood that both the foregoing general description and the following detailed description are explanatory only and are not restrictive. Among other things, the various embodiments described herein may be embodied as methods, devices, or a combination thereof. Likewise, the various embodiments may take the form of an entirely hardware embodiment, an entirely software embodiment or an embodiment combining software and hardware aspects. Furthermore, various operating systems and drivers can be used to provide a system providing dynamic feedback flash management. Likewise, any memory storage device that uses stored charge (which is typically subject to leakage) can benefit from this disclosure. The disclosure herein is, therefore, not to be taken in a limiting sense.

DETAILED DESCRIPTION

Figure 1:
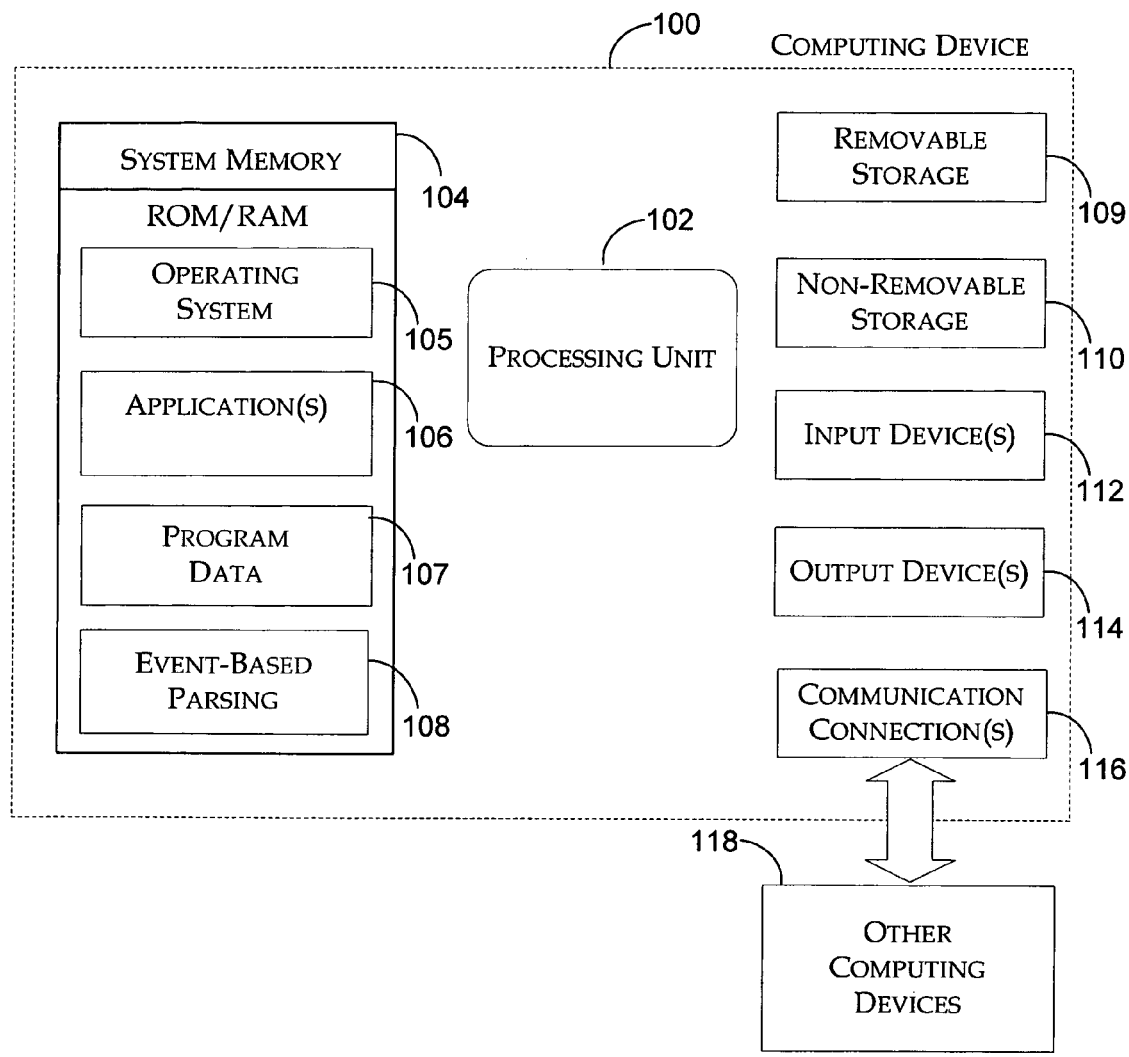
FIG. 1 is an illustration of an example operating environment and system for managing code assemblies.

As briefly described above, embodiments are directed to generation of managed code assemblies for network customization. With reference to FIG. 1, one example system for managed code assemblies includes a computing device, such as computing device 100. Computing device 100 may be configured as a client, a server, a mobile device, or any other computing device that interacts with data in a network based collaboration system. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. Generation of managed code assemblies (described below with reference to FIGS. 2-3) can be implemented using system memory 104.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Networks include local area networks and wide area networks, as well as other large scale networks including, but not limited to, intranets and extranets. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
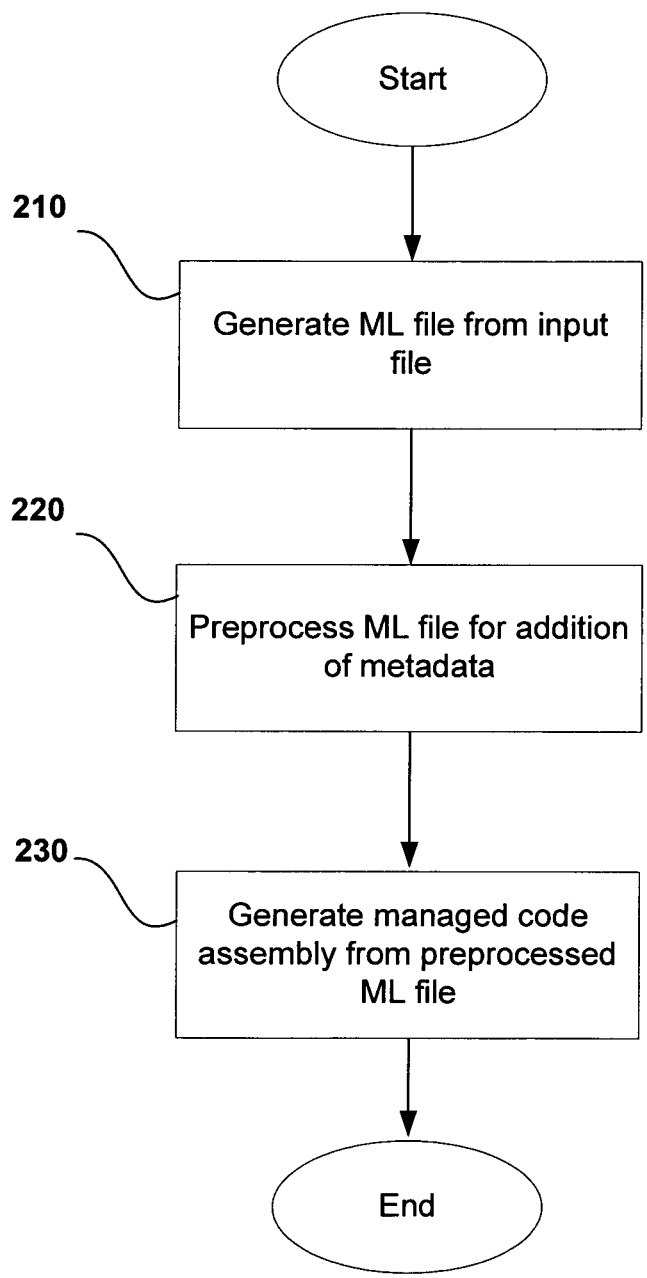
FIG. 2 is a top-level illustration of a flow diagram for managed code assemblies.

FIG. 2 is a top-level illustration of a flow diagram for managed code assemblies. In operation 210, a markup language file is generated from an input file. The input file can be written, for example, as a text file (such as a .dbc file), in an arbitrary language such as a C language file, in a markup language such as XML or other variants, or even input (such as a stream) provided by a user interface. Using standard XML as the output file allows interfacing with any front-end toolset that supports XML. This functionality can be provided by pre-processing the (proprietary) .dbc file to an XML file.

The output file is typically a markup language file which allows greater separation of the network design from the design tool. The tool separation allows for a much easier adaptation to different formats and more flexibility when working with the CAN database, for example, because during operation 210, support can be easily provided for any CAN database description format that can be converted to XML in a relatively small amount of time.

In operation 220, the markup language file produced in operation 210 can optionally be "preprocessed" to include metadata. The metadata allows additional information to be added (from a source other than the .dbc file). The metadata can be used to add enhancements such as security permissions, improved performance and network utilization, low-level filtering, and an improved developer experience.

Since all relevant information is usually kept in the XML representation, the addition of extended metadata can be provided in a variety of ways. The metadata can be provided by having a separate application applying parameters, by editing the readable XML format by hand, and/or by writing a XLST transformation that automatically modifies the attributes. Any combination of the above can also be used.

In operation 230, a managed code assembly is generated from a preprocessed markup language file. The managed code assembly includes a managed API that can include, for example, auto-completion for convenience of network designers. Additionally, the markup language input file is typically loaded at runtime, which allows changes to be made that do not require recompilation to handle changes of the .dbc file. To enhance compatibility with a precompiled application, a versioning system can be used.

The intermediate XML file may also be used to generate other useful data that can be used by the system. The other useful data can allow for signal level interaction such as signal filter lists, native code/header generation, documentation, and the like. These files are further described below with reference to FIG. 3.

Figure 3:
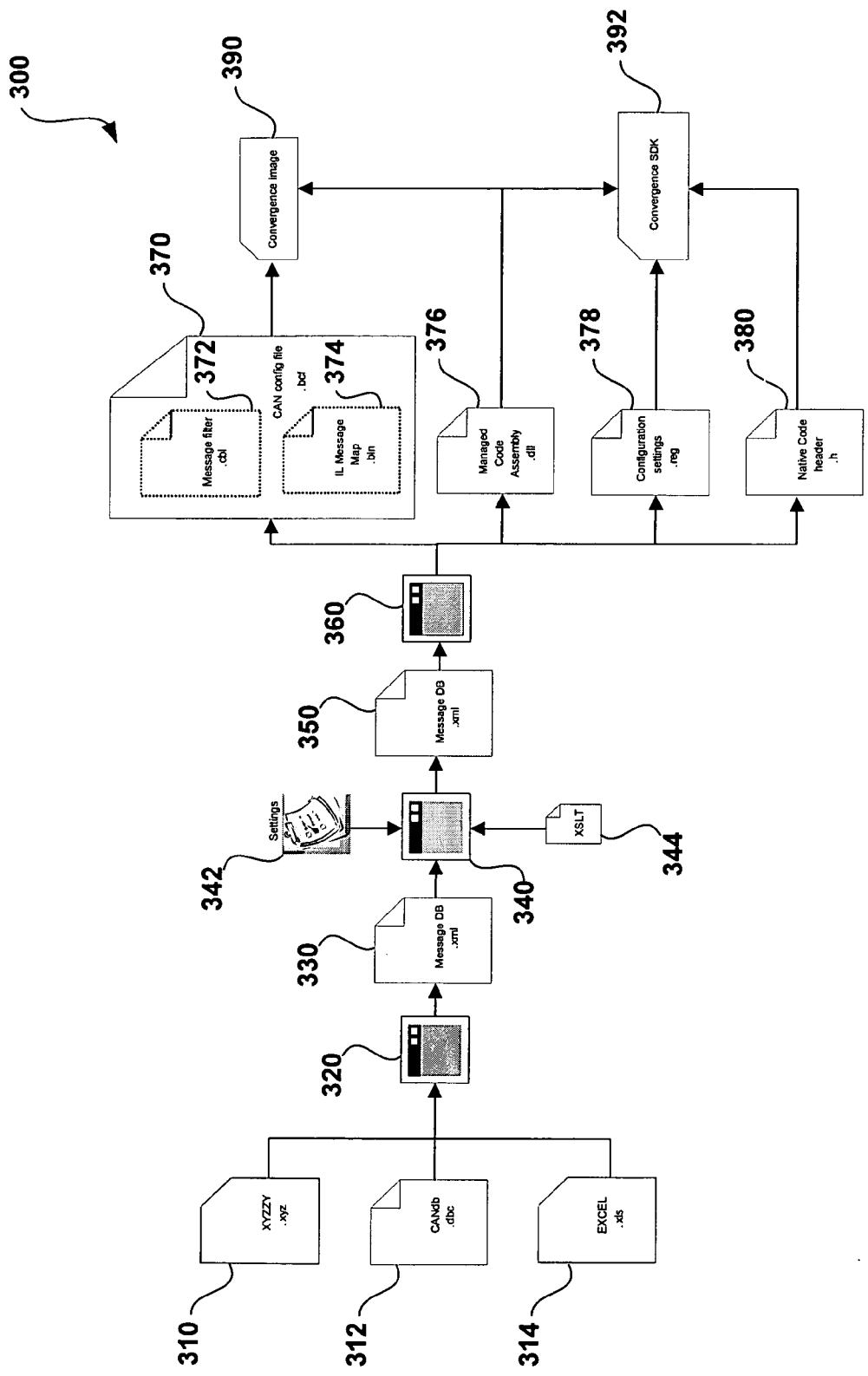
FIG. 3 is a top-level illustration of an architectural view for managed code assemblies.

FIG. 3 is a top-level illustration of architectural view for managed code assemblies. System 300 comprises markup language file generator 320. Markup language file generator 320 generates a format, if necessary, for an input file that is capable of being consumed by system 300. For example, input file 312 is a .dbc file (which is written in a proprietary, decipherable format) that can be parsed by markup language file generator 320 in order to produce an output file in a markup language.

An input file can be written in an arbitrary format when the parser is capable of understanding the input format. For example, input file 310 is written in an arbitrary format and can be translated by markup language file generator 320 into a markup language output file 330. Input file 314 represents a file that is written in an markup language that is capable of producing a markup language output file. Input file 314 can be parsed by markup language file generator 320 to produce a markup language output file 330 that can be in a different format (or even the same format) as input file 314.

System 300 further comprises an optional metadata preprocessor 340. Metadata preprocessor 340 transforms markup language file 330 using, for example, direct operator input (not shown), settings files 342 that can include settings for various ECUs, and extensible stylesheet language transformations via XSLT 344. Metadata preprocessor 340 produces markup language file 350 (that can be the same as—or different from—markup language file 330).

The general function for the metadata to be added by metadata preprocessor 340 includes iterating over the message map for each of the signals in each message and applying general rules and applying specific changes to certain messages and/or signals. The general rules may include, for example, converting a custom attribute "GenMsgCycleTime" to an attribute "Period," and setting correct timeout for received messages. The specific changes include adding support and events for specific CAN signals (such as button presses to be translated to managed code events) and support for multi frame message requirements that are not provided in the .dbc file for the CAN database.

System 300 further comprises an object generator 360. Object generator 360 automatically generates managed CAN object definitions and the related properties using the extended XML file data. Object generator 360 has multiple outputs including native code header generation (380), filter lists for signals (372), message maps (374), managed assembly generation (376) and configuration settings (378) in the form of registry files. Convergence image 390 is typically an optimized binary representation of the code to be ported to an ECU. Convergence system development kit 392 can be used for writing applications and managing code for any part of the system. An assembly versioning scheme allows for certain changes to be made without forcing all applications for a target CAN system to be recompiled.

The filter list 372 and message maps 374 can be stored in CAN configuration file 370. CAN configuration file 370 is used to enforce communication rules in the CAN interaction layers. As described below, message map changes are handled by system 300 in such a way that allows un-recompiled applications to successfully connect with an updated interaction layer (IL) configuration.

Updating message maps without requiring recompilation of applications is possible when certain kinds of changes are made, such as when adding new message and/or new signals. Compilation is also not needed when changing signal properties like "OnEvent" or "Initial value" (because these properties are typically only evaluated by the IL) and when changing message properties such as the timing and transmission type.

Other changes can be made to the message map that would usually require existing applications to be recompiled for the applications to interact correctly with the IL configuration. The other changes include deleting an existing message and/or signal, renaming messages and/or signals, changing the DLC (data link control) information for a message, and changing the position and/or size of a signal. Additionally, changes made to properties used by a wrapper to present the signal to an application typically require a recompile.

While the above changes that would normally be identified by the tool generating the compatible message map, changes such as semantic changes of a message and/or signal may require human intervention to properly identify. The programmer can instruct the tool to change the version information so an existing application does not incorrectly access a signal or message that has a changed meaning.

The version information typically comprises a major version change and a minor version change. The minor version is incremented whenever there were changes that still maintain compatibility with the predecessor version. To minimize the impact on existing applications, the version information is typically wrapped within the GUID that has last been used to validate the matching of message maps. There is also usually no need to expose the structure to applications because applications normally do not have a need to access the version information directly.

The above specification, examples and data provide a complete description of the manufacture and use of embodiments of the invention. Since many embodiments of the invention can be made without departing from the spirit and scope of the invention, the invention resides in the claims hereinafter appended.

We claim:

1. A computer-implemented method for controlling a first memory device, comprising:
   receiving a description of a network protocol for a control area network (CAN), wherein electronic control units (ECUs) communicate across the CAN, and wherein the description of the network protocol includes protocol requirements for communicating across the CAN;
   translating the received network protocol description into a markup language description;
   modifying the markup language description to include functionality for at least one of (1) communicating across the CAN when the description of the network protocol changes and (2) protocol requirements not provided in the received network protocol description;
   generating CAN object definitions and related properties using the modified markup language description, wherein the related properties provide extended functionality for the ECUs to communicate across the CAN, and wherein the extended functionality includes at least usage hints for optimizing the communication across the CAN based on the usage;
   creating a convergence image from the CAN object definitions and related properties, wherein the convergence image is in a binary format; and
   porting the convergence image to at least one of the ECUs.

2. The method of claim 1 wherein the related properties comprise a message map; wherein the message map is modifiable without recompiling.

3. The method of claim 2 wherein the message map comprises signal properties.

4. The method of claim 1 further comprising generating an application programming interface (API) in response to the modified markup language description.

5. The method of claim 1 further comprising adding metadata to the markup language description, wherein the metadata provides security permissions and low-level filtering.

6. The method of claim 1 wherein the description of a network protocol is contained within a ".dbc" file.

7. The method of claim 1 further comprising generating a memory image for a network device.

8. The method of claim 7 wherein the network device is an electronic control unit (ECU).

9. The method of claim 1 further comprising applying an extensible stylesheet transformation (XSLT) to the markup language description.

10. The method of claim 1 further comprising applying general rules to the markup language description to signals in each message comprised by a message map.

11. A system for event-based parsing of an input file, comprising:
    at least one processor:
    memory, operatively connected to the at least one processor, encoding computer executable instructions that, when executed by at least one processor, cause the at least one processor to perform a method, the method comprising:
    receiving a network description for a control area network (CAN) and generating a markup language description by using the received network description, wherein the network description includes network protocol requirements for communicating across the CAN;
    adding metadata to the markup language description to include functionality for at least one of (1) communicating across the CAN when the network description changes and (2) protocol requirements not provided in the received network description and to produce a markup language description having metadata;
    generating CAN object definitions and related properties using the markup language description having the added metadata, wherein the related properties provide extended functionality for communicating across the CAN, and wherein the extended functionality includes at least usage hints for optimizing the communication across the CAN based on the usage; and
    generating a convergence image created from the CAN object definitions and related properties, wherein the convergence image is in a binary format, and wherein the convergence image is ported to an electronic control unit (ECU) that communicates over the CAN.

12. The system of claim 11, the method further comprising receiving a controller network database description as the received network description.

13. The system of claim 11, the method further comprising applying metadata for settings of electronic control units.

14. The system of claim 11, the method further comprising generating a system development kit for managing the network object.

15. The system of claim 11, wherein the network object comprises a ".dll" for exposing an API.

16. The system of claim 11, the method further comprising maintaining IL (interaction layer) compatibility with version information comprising major versions and minor versions, wherein major version changes require application recompilation and minor version changes do not require application recompilation.

17. The system of claim 16 wherein a minor version change comprises an addition of a new signal.

18. A computer storage memory device having computer-executable instructions that, when executed by a processor, perform a method comprising:
adding metadata to a network description for a control area network (CAN) to include functionality for at least one of (1) communicating across the CAN when the network description changes, and (2) protocol requirements not provided in the network description;
creating CAN object definitions and related properties using the network description with the added metadata, wherein the related properties provide extended functionality for communicating across the CAN, and wherein the extended functionality includes at least usage hints for optimizing the communication across the CAN based on the usage, wherein the related properties comprise a message map, and wherein generating CAN object definitions and the related properties comprises iterating through the message map and applying rules to the message map;
generating a convergence image created from the CAN object definitions and related properties, wherein the convergence image is in a binary format; and
porting the convergence image to a network device for execution on the network device.

19. The computer storage memory device of claim 18, the method further comprising generating a system developers kit for the network object.

20. The computer storage memory device of claim 18, the method further comprising generating a native header file for generating code for network devices.

* * * * *